March 1, 1949.  A. KIPNIS  2,463,112
TWISTED CRULLER MACHINE
Filed May 28, 1947  7 Sheets-Sheet 1

INVENTOR.
ABRAHAM KIPNIS
BY Maurice Landis
ATTORNEY

March 1, 1949.   A. KIPNIS   2,463,112
TWISTED CRULLER MACHINE
Filed May 28, 1947   7 Sheets-Sheet 2
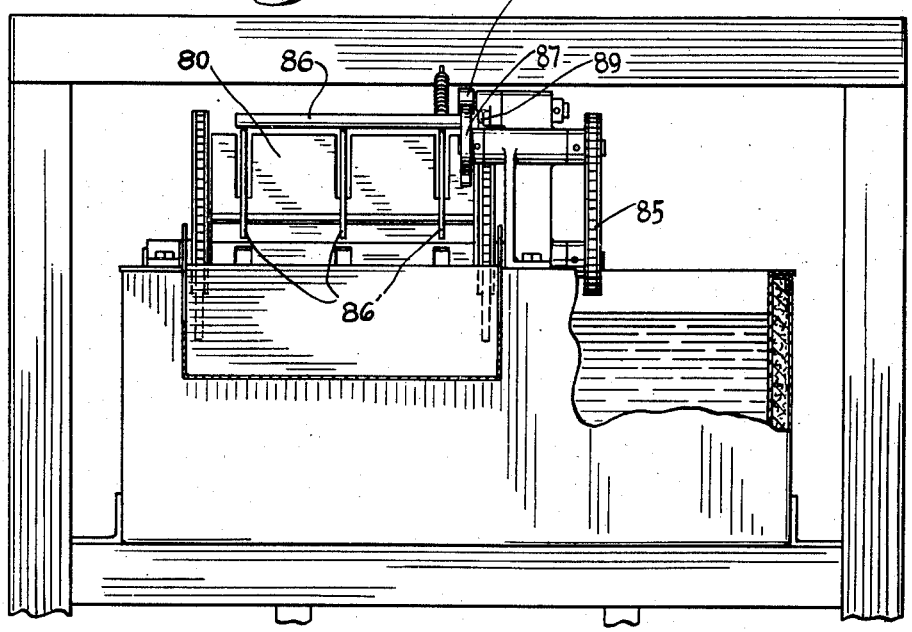
Fig. 2.
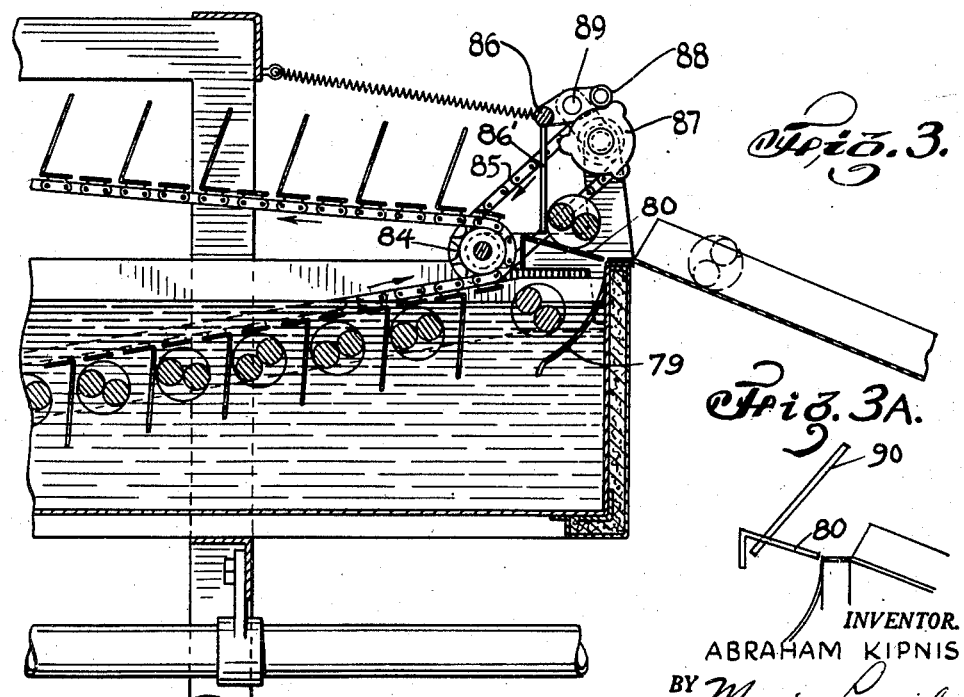
Fig. 3.
Fig. 3A.
INVENTOR.
ABRAHAM KIPNIS
BY
ATTORNEY March 1, 1949.　　　　A. KIPNIS　　　　2,463,112
TWISTED CRULLER MACHINE Filed May 28, 1947　　　　　　　　　　　7 Sheets-Sheet 3

INVENTOR.
ABRAHAM KIPNIS
BY Maurice Lander
ATTORNEY

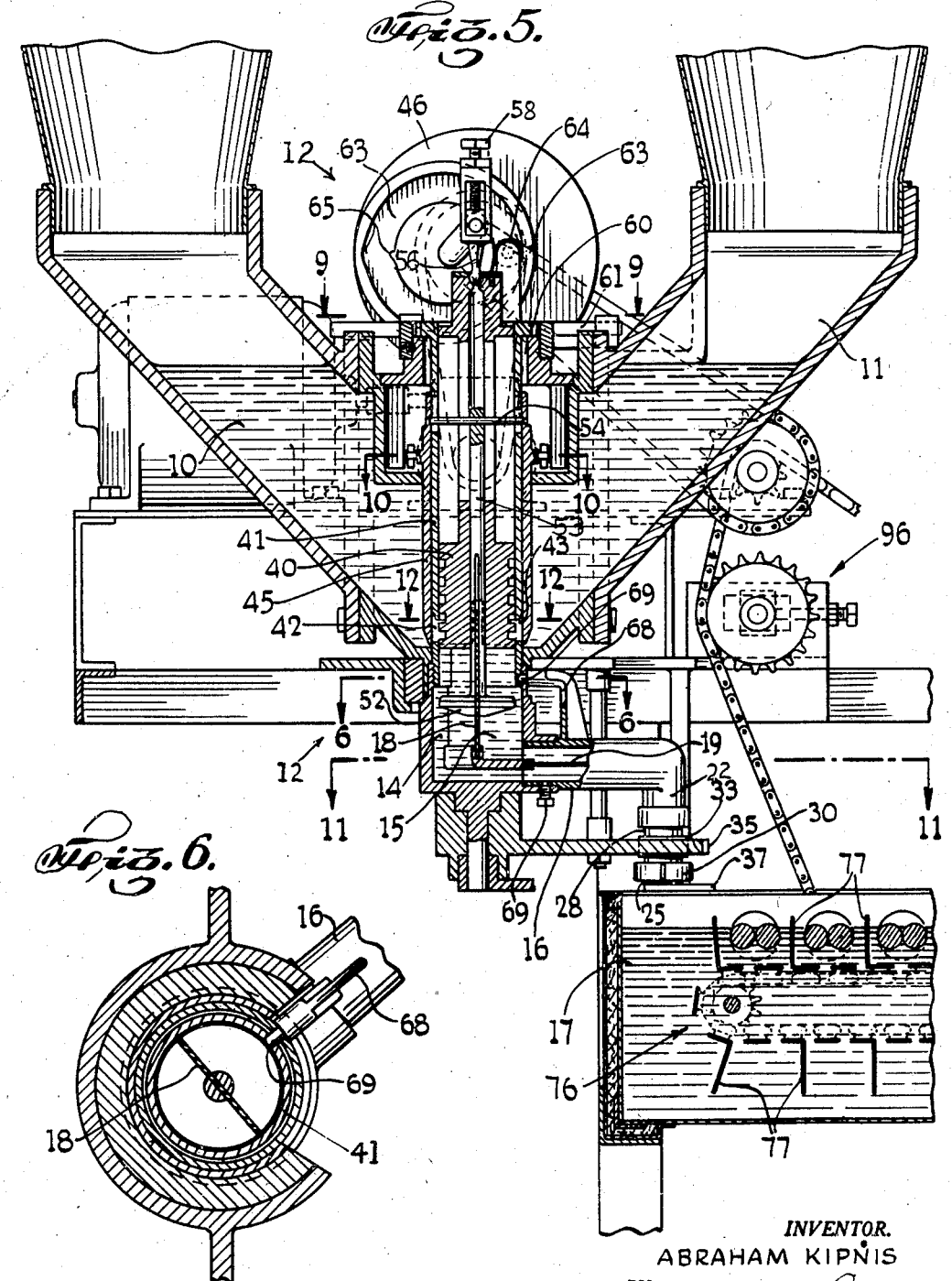

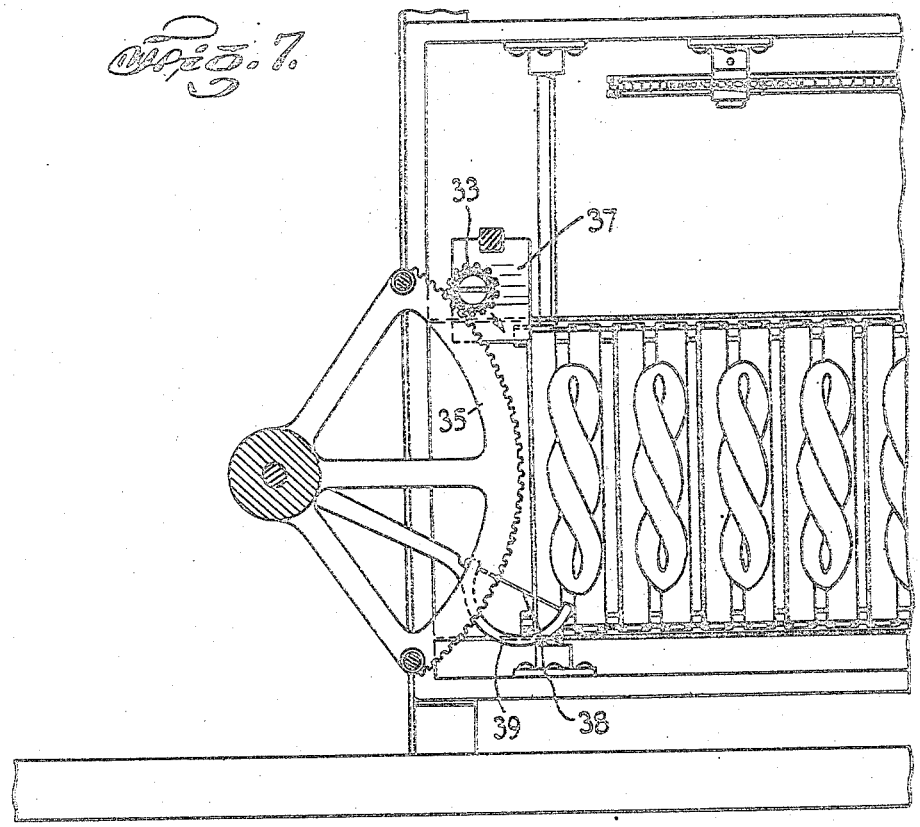
Fig. 7
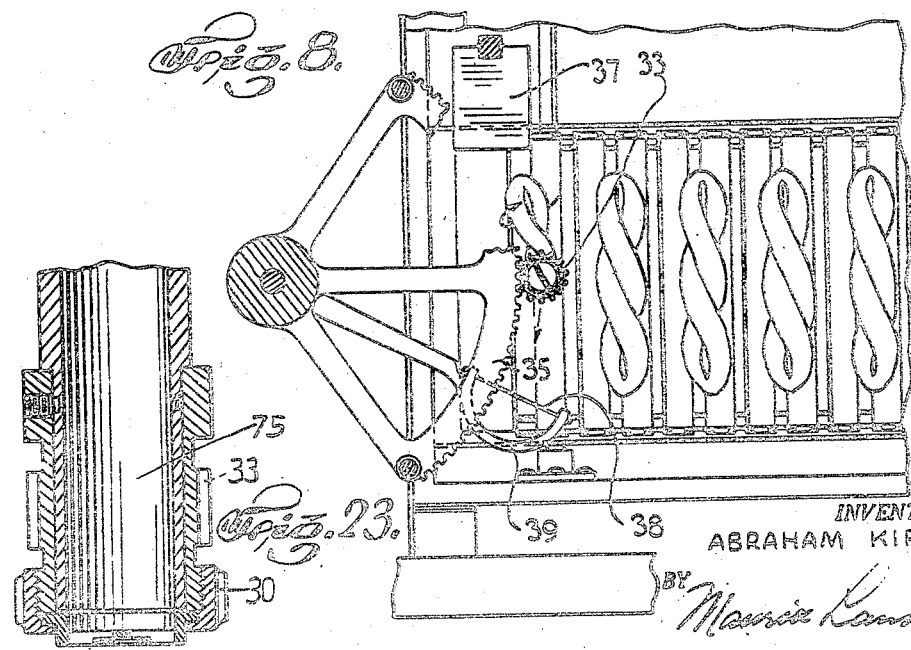
Fig. 8
Fig. 23
INVENTOR.
ABRAHAM KIPNIS
ATTORNEY

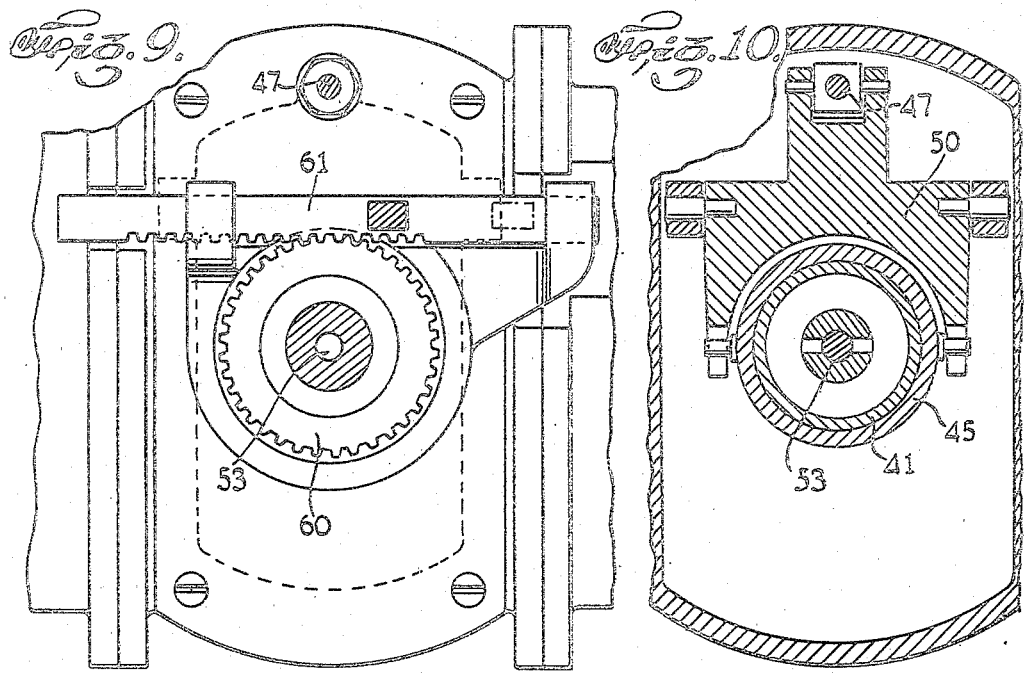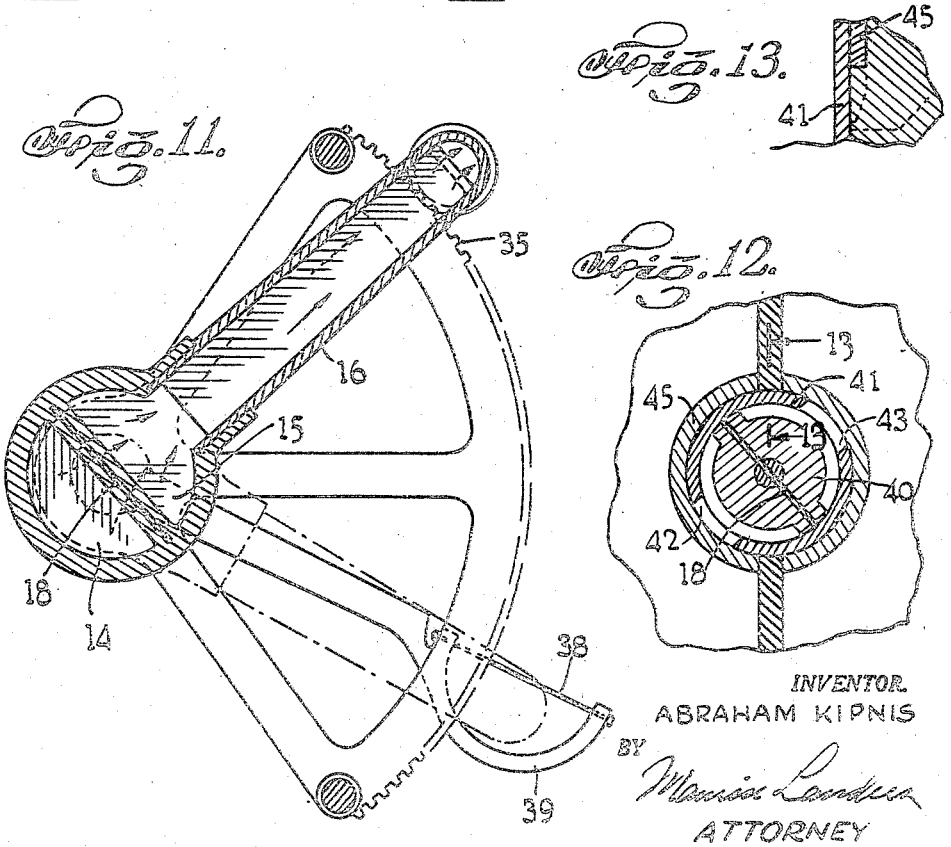

March 1, 1949.  A. KIPNIS  2,463,112
TWISTED CRULLER MACHINE
Filed May 28, 1947  7 Sheets-Sheet 7
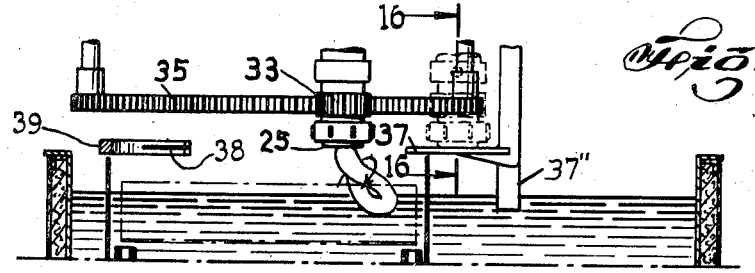
Fig. 14.
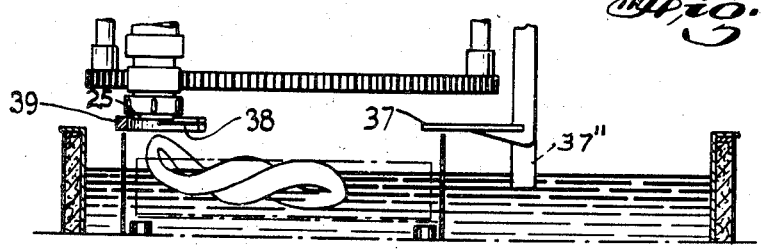
Fig. 15.
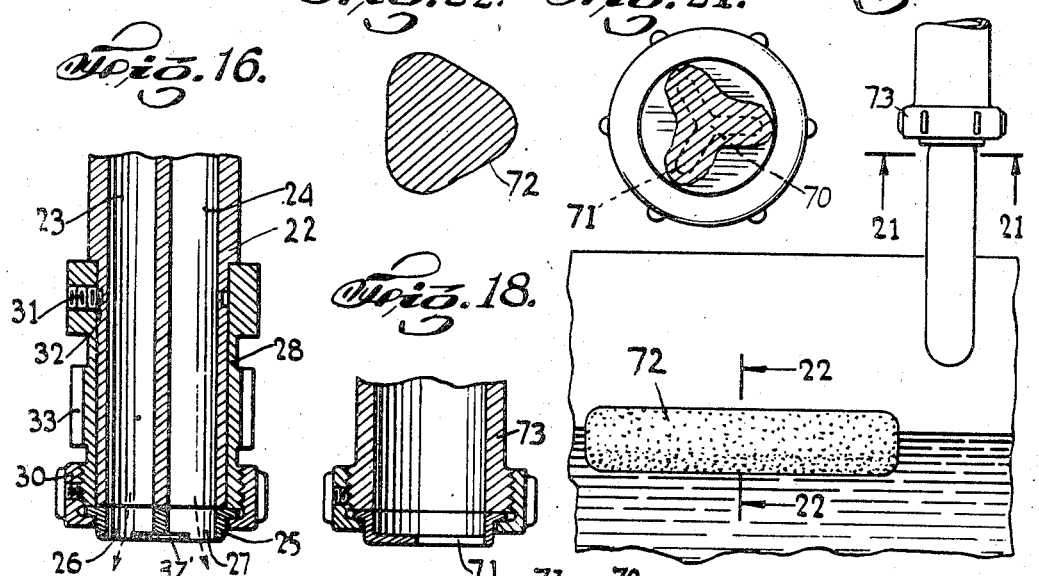
Fig. 22.  Fig. 21.  Fig. 20.
Fig. 16.
Fig. 18.
Fig. 17.  Fig. 19.
INVENTOR.
ABRAHAM KIPNIS
BY
Maurice Landau
ATTORNEY Patented Mar. 1, 1949

2,463,112

UNITED STATES PATENT OFFICE 2,463,112

TWISTED CRULLER MACHINE

Abraham Kipnis, Forest Hills, N. Y.

Application May 28, 1947, Serial No. 751,034

19 Claims. (Cl. 107—54)

The present invention relates to machines for forming dough or the like into individual formed pieces and has for an object to provide an improved apparatus for extruding successive charges and laying them in a cooking medium.

Another object of the invention is to provide means to twist and deposit successive charges of substantial length in a cooking medium.

Another object is to provide an apparatus by which "soft dough" or "fluent dough" can be manipulated to deliver separate formed charges into a hot cooking medium in such condition that a crust will be immediately formed thereon to retain the desired shape of the finished product. The terms "soft dough" and "fluent dough" are used herein to define a dough which is of a consistency suitable for manipulation by a pump in which relatively little power is necessary and whereby the dough flows readily both in response to suction and in response to pressure applied. The dough described by this term and for which the apparatus herein described is more particularly designed is too soft to be worked by hand in the making of cruller sticks. It may be so soft and fluent that if two extrusions of dough issue in contact with each other they adhere, merge and become one.

The invention provides an apparatus which delivers simultaneously two laterally separated lengths of the fluent dough from a two aperture nozzle into hot fat by which a crust is formed to prevent adhesion when later the two lengths come in contact. The nozzle rotates to twist the two lengths of dough one about the other. Whether the two lengths are connected by adhesion at their forward lower ends or not, as they enter the hot fat the fat exerts a sufficient drag inhibiting rotation so that the two extrusions are twisted one about the other by the rotating nozzle to form the common twisted cruller stick. Centrifugal force tends to space the extrusions, and the hot fat, perhaps 380 to 390 degrees F., forms an adhesion inhibiting crust before the twisting action brings the two elements into contact. It is because the fluent dough has so little stiffness that the resistance of the liquid fat provides adequate drag to facilitate the twisting noted above.

As an example, a soft dough of suitable consistency for successful operation in a preferred apparatus may be made by mixing with a given weight of water twice that weight of a prepared flour such as that used in making machine-made doughnuts. The flour may consist of wheat flour, vegetable oil as shortening, egg yolk, milk powder, sugar and flavoring. Such dough is too soft and glue-like for satisfactory handling by the bare hands and is termed "soft dough" in the trade. It is moist and sticky, whereby two pieces coming in contact readily adhere to each other. It flows freely, forms well and swells to a large bulk and light texture during frying.

Another object is to provide means for connecting two charges or lengths of dough extruded side by side.

The invention has been developed more particularly in the production of an apparatus for forming twisted cruller sticks made of fluent dough which may be of two kinds or flavors and discharging the same into a bath of hot fat wherein they are cooked and such an apparatus will be more particularly described for the purposes of illustrating the principles of the invention. It will be understood, however, that certain features of the invention shown can be used for other purposes and the principles of the invention can be embodied in other constructions. For example, the arrangement for extruding two kinds of dough to form one cake is capable of use in making cakes of entirely different forms than the form herein illustrated.

The nature and various objects of the invention will be better understood from a consideration of a description of a selected illustrative embodiment for the purpose of which description reference should be had to the accompanying drawings forming a part hereof and in which—

Fig. 2 is an end view taken on the line 2—2 of Fig. 1, a portion being shown in section.

Fig 3 is a longitudinal sectional detail view on an enlarged scale showing details of the ejector mechanism shown in Fig. 1.

Fig. 3A is a detail view showing a modified arrangement for ejecting the doughnut.

Fig. 5 is a vertical sectional view through the center of the pump taken on the line 5—5 of Fig. 4.

Fig. 6 is a horizontal sectional view taken on the line 6—6 of Fig. 5.

Fig. 7 is a sectional plan view taken on the line 7—7 of Fig. 1.

Fig. 8 is a view similar to Fig. 7 but showing the parts in a different operative position to illustrate the effect of the twisting operation.

Fig. 9 is a sectional plan detail view, taken on the line 9—9 of Fig. 5.

Fig. 10 is a sectional plan detail view taken on the line 10—10 of Fig. 5.

Fig. 11 is a sectional plan detail view taken on the line 11—11 of Fig. 5.

Fig. 12 is a sectional plan detail view taken on the line 12—12 of Fig. 5.

Fig. 13 is a vertical sectional detail view taken on the line 13—13 of Fig. 12.

Figs. 14 and 15 are vertical sectional detail views taken substantially on the line 14—14 of Fig. 1 showing the parts in different positions illustrating the operations of the twisting and cut-off mechanisms.

Fig. 16 is a central sectional view of the delivery portion of the nozzle taken on line 16—16 of Fig. 14 showing a rotatable discharge member.

Fig. 17 is a bottom plan view of the parts shown in Fig. 16.

Figs. 18 and 19 are central sectional and bottom plan views, respectively, of another form of nozzle.

Fig. 20 is a side view indicating the operation of the nozzle shown in Figs. 18 and 19.

Fig. 21 is a sectional view taken on the line 21—21 of Fig. 20.

Fig. 22 is a sectional view taken on the line 22—22 of Fig. 20 indicating the shape of the cruller stick extruded from the nozzle of Figs. 18 and 19 after swelling during cooking.

Fig. 23 is a central sectional detail view of a nozzle similar to that shown in Fig. 16 but without a central partition.

Fig. 24 is a detail view of a formed and cooked twisted cruller stick made of two kinds of material.

Fig. 25 is a similar view of a twisted cruller stick made of one kind of material.

Fig. 26 is a perspective view of an untwisted cruller stick formed by the nozzle shown in Figs. 18 and 19 and cooked.

Figure 1:
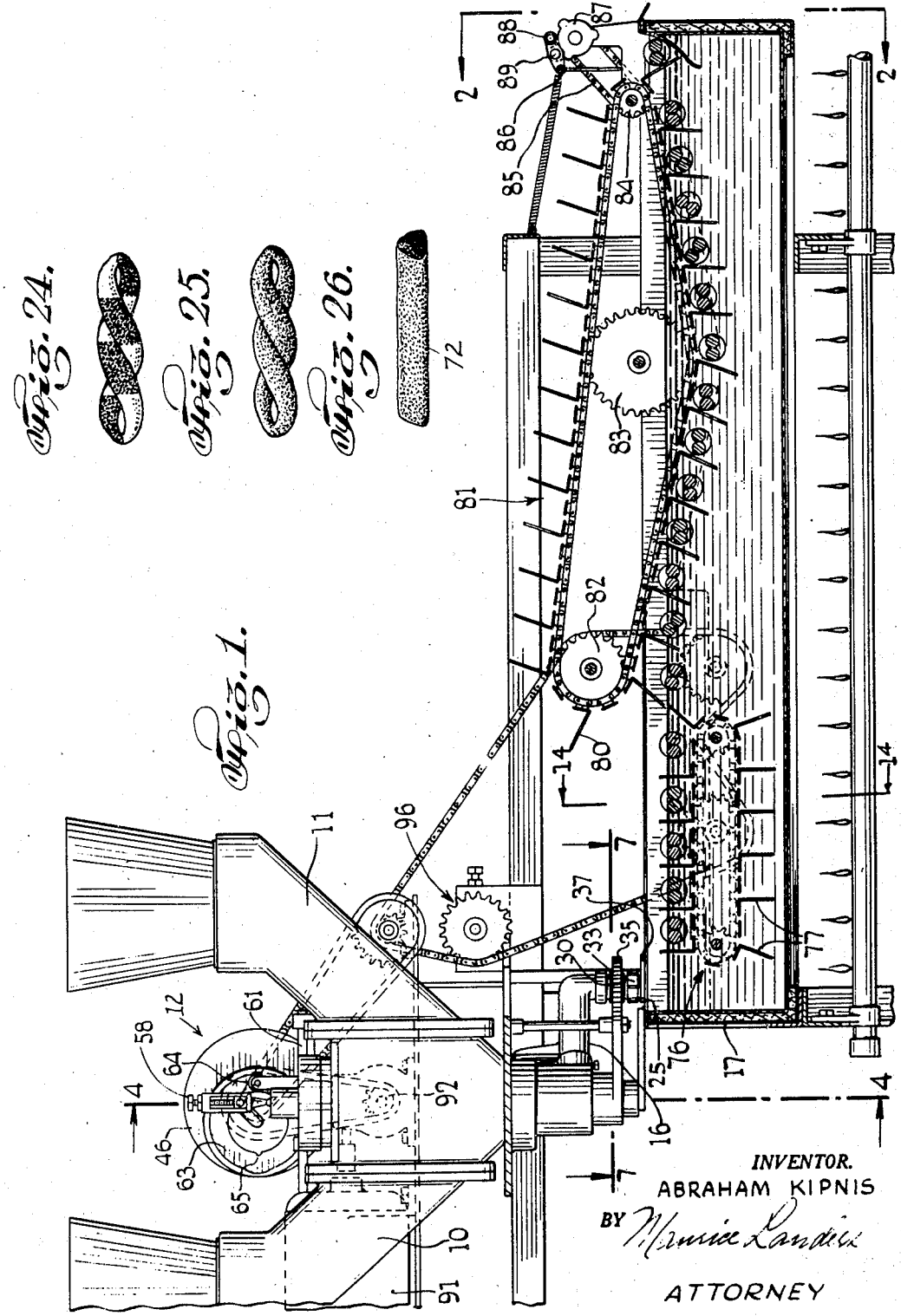
Figure 1 is a side view, partly in section, of an illustrative apparatus embodying the invention.

As shown in Fig. 1, the machine comprises two dough hoppers from which soft dough is fed through a nozzle and dropped into a tank of hot fat whence it is carried forward in the fat by conveyors and discharged when thoroughly cooked.

The machine comprises two hoppers or reservoirs 10, 11 (Fig. 5) for dough, which dough may be of the same or different kinds. A two-part force pump 12 is provided to feed dough simultaneously from the two reservoirs downward through two passageways 14, 15 and through the nozzle 16 from which the dough is discharged into a tank 17 adapted to contain hot fat. The central passages 14, 15 and continuations thereof in the nozzle 16 are separated by a central web or partition 18, 19 which causes the dough from the two hoppers to be led separately to the discharge end of the nozzle and through two separate discharge outlets from which it is ejected intermittently to form separate cruller sticks each consisting of two parts. The vertical part 22 of the discharge nozzle 16 is shown in section in Fig. 16. It comprises two passageways 23, 24 separated by a central web. At the bottom of the nozzle a rotatable member 25 is formed with two discharge outlets 26, 27 from which lengths of dough are extruded and twisted one about the other. The nozzle discharges close to the level of the hot fat, preferably within less than one inch above the surface. It is to be noted that the apertures 26, 27 are generally triangular in shape with points toward each other and substantially spaced to give a corresponding cross section to the extruded lengths of dough. By this arrangement the hot fat flows quickly between the two extrusions immediately forming a crust which inhibits adhesion before the two lengths swell in cooking or are brought together by the twisting operation.

The arrangement for dividing the discharge nozzle into two passageways is best indicated in Figs. 5, 6, 11, 12 and 16. Obviously, the dividing partitions may be omitted and one kind of dough used.

As the delivery section 25 (Fig. 16) of the discharge nozzle rotates relative to the vertical section 22 the extrusions of dough issuing from the passages 23, 24 will be so cut by the rotating element that for a portion of the rotation dough from one hopper will issue from one opening and for another portion of the rotation dough from the other hopper will issue from that opening. Accordingly, each of the two sections twisted together will have portions of each kind of dough. This is indicated in Fig. 24. The nozzle member 25 is secured to a sleeve 28 rotatable on the vertical portion 22 of the nozzle as indicated in Fig. 16. A nut 30 secures the member 25 to the sleeve 28, which in turn is held in place on the vertical nozzle member 22 by a set screw 31 engaging in an annular recess 32 on the part 22. The nozzle member 25 can be left in fixed position relative to the nozzle or it can be arranged to be rotated by means of a pinion 33 formed on its periphery and engaging an arcuate rack 35 as shown in Figs. 5, 7 and 14. Obviously, the separating webs 18, 19 and the like may be omitted when only one dough is to be used.

When forming two-part crullers, whether or not they are twisted, it is desirable to unite the two separate charges issuing from the two discharge outlets. For this purpose a stop or abutment plate 37 of suitable shape to cause the two lengths to be united is provided beneath the nozzle when in one extreme position. Preferably the nozzle is recessed as indicated at 37', the better to cause the two extrusions to flow together and form a connecting bridge. The timing of the pump action and nozzle movement provides for suitably pressing the two extrusions momentarily against the plate and into adhering contact with each other in the recess before the nozzle swings away from the plate. As shown, the end of the nozzle member 25 practically rubs over the plate 37 to scrape the plate clean at each operation. When the dough is of suitable consistency and reasonably moist, as in the fluent dough described above, the ends are easily united by a plate or stop which is flat, it not being necessary to provide a curved plate or other special means for pinching the two ends together. A flat plate is accordingly shown. The plate 37 may be heated merely by means of radiation from the hot fat or if desired it may be formed with a depending part 37" to extend into the fat and to constitute a more positive heating means to prevent sticking of the dough thereto.

As the forward ends of the lengths of dough engage the fat they are sufficiently inhibited from rotation with the nozzle by such engagement in the fat to cause a sufficient twist of the lengths of soft dough. A sufficient crust forms quickly to hold the shape as desired.

In order to connect the opposite ends of the two lengths of dough and, also, to completely sever the same from adherence to the nozzle a cut-off wire 38 (Figs. 7, 11 and 15) is carried in a suitable frame 39 at a position to engage and sever the dough.

Figure 4:
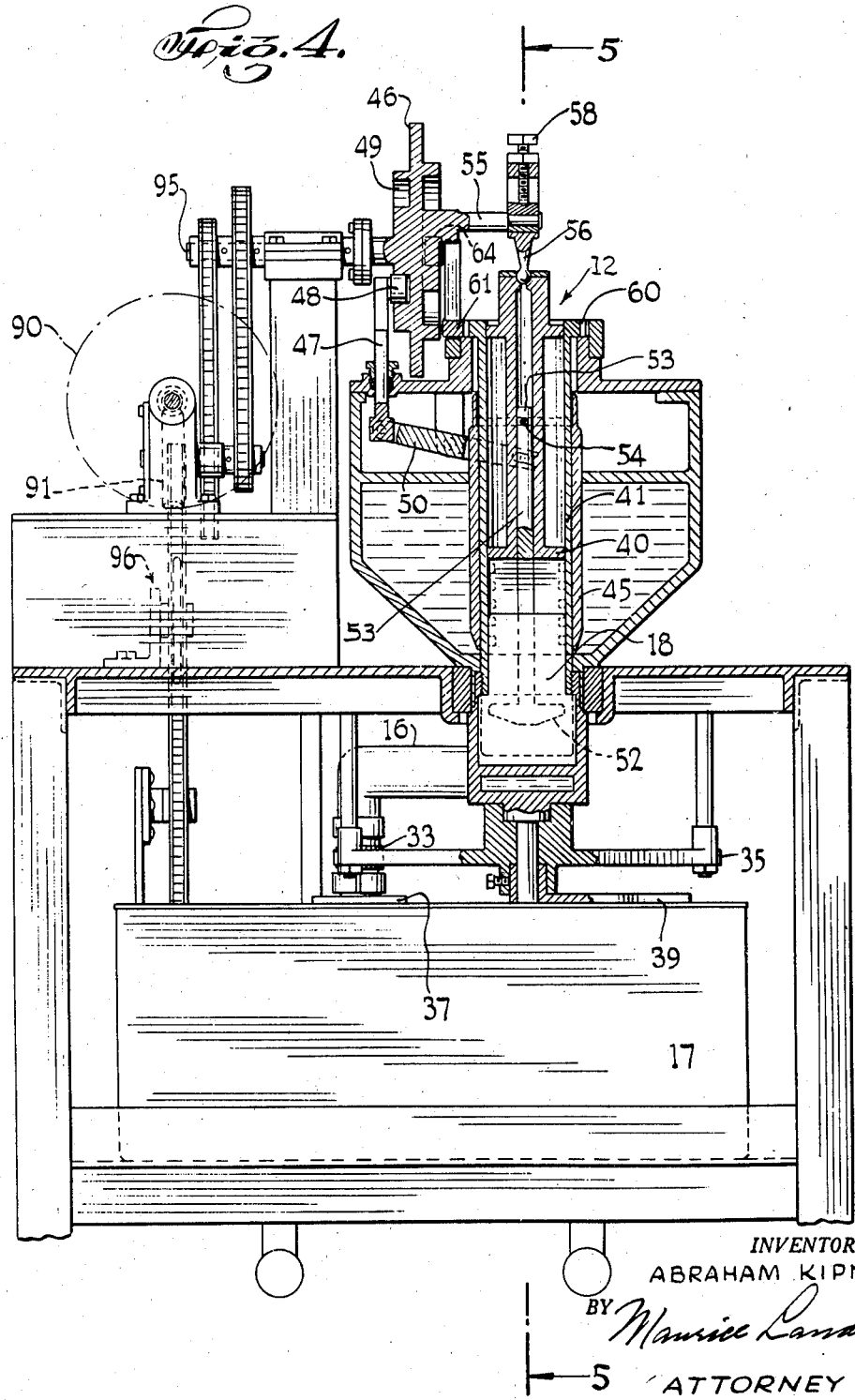
Fig. 4 is a vertical sectional view through the center of the pump taken on line 4—4 of Fig. 1.

The pump is shown in detail in Figs. 4 and 5.

It comprises two plungers, which in fact are formed for convenience of construction as one integral plunger 40, which is slotted to divide it into two operative sections. The effect of such construction is to provide plunger means for each of the two dough reservoirs. The plunger operates in a sleeve 41 having ports 42 and 43 opening respectively into the hoppers or dough reservoirs 10 and 11. These ports are controlled by a sleeve valve 45 to open the ports during the upward or suction movement of the pump piston or plunger 40 and to close the same during the downward or feeding movement of the plunger. The sleeve is actuated by the cam 46 through the vertical connecting rod 47 (Fig. 4) carrying a roller 48 engaging in the groove 49 of the cam and a lever 50 pivoted in the casing and engaging the valve sleeve as best shown in Fig. 10.

In order suitably to control the flow of dough from the pump a valve 52 is provided at the lower end of the pump cylinder 41. The stem 53 of the valve extends upwardly through the plunger 40 for actuation by a horizontal pin 54 which connects it to the sleeve valve 45 for operation simultaneously therewith.

The piston 40 is actuated from a crank pin 55 on the cam 46 through a link 56 connected by a ball-and-socket joint to the upper end of the piston. The effective length of the link 56 can be adjusted in any suitable way, as by substituting bearing blocks of different sizes in the channel of the link and clamping the same by means of the set screw 58.

In order to move the discharge end of the nozzle 16 through a suitable arc to lay the severed cruller in the fat means is provided for swinging the nozzle. In the particular arrangement shown, instead of moving the nozzle while leaving the main parts of the pump non-rotative provision is made for rotating the pump cylinder together with the nozzle. As shown in the drawing, Figs. 4, 5 and 9, the upper end of the pump cylinder is provided with a gear 60 engaging rack 61, which in turn is actuated by the cam 46 through an eccentric groove 63, into which a roller 64 connected to the rack engages. The cam groove 63 is formed at 65 to provide a momentarily accelerated movement. This movement gives the swinging nozzle an accelerated movement at the moment of cut-off of the dough by the cut-off wire 38 (Figs. 7 and 15). This causes a quick clean cut-off. As shown in Figs. 5 and 6, the nozzle 16 is formed with a bracket 68 having a projection 69 extending into the sleeve 41 and providing a lock to prevent relative rotation. This nozzle is held in place in the machine by a set-screw 69' which permits removal for replacement by a modified nozzle when desired.

Modified nozzles are indicated in Figs. 18, 19, and 23. The nozzle 73 shown in Figs. 18 and 19 provides a discharge aperture 70 having three thin radial portions 71 such that as the dough swells in cooking it will form a cruller 72 of substantially triangular shape in cross section instead of round. The nozzle 75 of Fig. 23 is similar to the nozzle first described but with the separating partitions omitted.

The twisted cruller drops from the nozzle into the fat and because of the lateral movement of the nozzle the cruller drops in a position transverse to the tank. At first the cruller sinks in the hot fat because of the relative weight of the dough. The movement of the conveyor 76 is so timed relative to the movement of the nozzle that one of the blades 77 comes into position to receive the cruller as it drops and to lift it and carry it forward in the cooking tank. The cruller soon expands sufficiently to float and is carried forward floating by a blade 77 until it is in position to be received and carried forward by a second conveyor 81. The movement of the two conveyors is suitably timed so that as the cruller is passed forward by a blade 77 it is picked up by a blade 80 of the second conveyor and carried forward to a guide 79 at the point of delivery. The conveyor 81 is arranged to force the floating cruller beneath the surface of the fat to insure complete cooking. The sprocket wheels 82, 83 and 84 on which the conveyor 81 is mounted are suitably arranged for this purpose, the sprocket wheel 83 extending substantially beneath the surface of the fat. At the delivery end of the tank the cruller engages the curved guide plate 79 against which it is lifted by the blade 80 for delivery to a chute at the end of the tank. The blades 80 are formed at such an angle to the length of the conveyor that as the cruller reaches the level of the chute it tends to roll or slide from the blade on to the chute. Positive ejector mechanism is, however, provided to insure delivery of the cruller. As shown a chain 85 driven by a sprocket co-axial with the sprocket 84 actuates an ejector 86 to push the cruller from its position on the blade 80 onto the chute. Three rods 86' of the ejector operate through slots in the blades 80. As shown a cam 87 is driven by the chain 85 and operates a follower 88 carried by the member 86 which is pivoted at 89.

Alternatively, as shown in Fig. 3A, the movement of the doughnut from the blade 80 onto the chute can be insured by rods 90 held in fixed position and extending through slots in the blades 80 as the blades pass. The rods are placed at such an angle that as a blade 80 moves upward lifting the cruller above the edge of the cooking tank the cruller will be pressed forward and onto the chute by the rods.

The foregoing particular description is illustrative merely and is not intended as defining the limits of the invention. Various modifications in construction and arrangement can be made without departing from the spirit of the invention.

This application is a continuation in part of applicant's co-pending application, Ser. No. 532,569, filed April 25, 1944, now abandoned.

I claim:

1. A device of the character described for feeding dough comprising a reservoir for dough, a discharge nozzle having at least two discharge apertures, means for feeding dough from the reservoir to and through the nozzle to discharge predetermined charges intermittently therefrom, means for moving the nozzle laterally through a predetermined distance during the discharge of dough from the nozzle, a cut-off and uniting device positioned below the nozzle close to the end of the path of movement thereof whereby as the nozzle moves over the cut-off device the extruded dough is severed and the charges from the different apertures are connected.

2. A device of the character described for feeding dough comprising a reservoir for dough, a discharge nozzle having at least two discharge apertures, means for feeding dough from the reservoir to and through the nozzle to discharge predetermined charges intermittently therefrom, means for causing the charges of dough issuing from the nozzle apertures to be connected at their forward ends, and means for cutting off and uniting the lengths of dough at their rear ends.

3. A device of the character described for feeding dough comprising a reservoir for dough, a discharge nozzle having at least two discharge apertures, means for feeding dough from the reservoir to and through the nozzle to discharge predetermined lengths intermittently therefrom, and a stop beneath the nozzle against which the forward ends of the lengths of dough emerging from the apertures engage and by which they are united, means for causing relative movement between the lengths of dough and the stop to free the united ends from the stop and means for pressing together and uniting the rear ends of the lengths of dough.

4. In an apparatus of the character described for forming cruller sticks, the combination with a container adapted to contain hot fat of a reservoir for dough supported above said container but closely adjacent thereto, a discharge nozzle having at least two discharge apertures leading downwardly and laterally from said reservoir, said nozzle being movable in a horizontal arc and means for twisting the dough emerging from said apertures while a portion of the dough is engaged in the fat and inhibited from rotation thereby to form a twisted cruller stick.

5. Apparatus of the character described comprising a reservoir for soft dough, a discharge nozzle connected to the reservoir having at least two discharge apertures, a tank for supporting a body of hot fat to receive charges of dough extruded from the nozzle, means for feeding dough from the reservoir through the nozzle to discharge lengths of dough directly into the liquid fat and a plate arranged to be heated and positioned to engage and unite the lengths of dough to each other at their forward ends before they reach the hot fat.

6. Apparatus of the character described comprising a reservoir for soft dough, a discharge nozzle connected to the reservoir having at least two discharge apertures, a tank adapted to hold hot fat in position to receive dough discharged from the nozzle, means for feeding dough from the reservoir through the nozzle to discharge lengths of dough therefrom into the hot fat, means for engaging and uniting the lengths of dough to each other at their forward ends, and means for rotating the nozzle to twist the lengths of dough being fed therefrom while their forward ends are engaged in the fat and inhibited from rotation with the nozzle by such engagement.

7. Apparatus of the character described comprising a reservoir for soft dough, a discharge nozzle connected to the reservoir having at least two discharge apertures, a tank adapted to hold hot fat in position to receive dough discharged from the nozzle, means for feeding dough from the reservoir through the nozzle to discharge lengths of dough therefrom into the hot fat and means for rotating the nozzle to twist the lengths of dough being fed therefrom while their forward ends are engaged in the fat and inhibited from rotation with the nozzle by such engagement.

8. Apparatus of the character described comprising a reservoir for soft dough, a discharge nozzle connected to the reservoir having at least two discharge apertures, a tank adapted to hold hot fat in position to receive dough discharged from the nozzle, means for feeding dough from the reservoir through the nozzle to discharge lengths of dough therefrom into the hot fat, means for causing relative movement between the nozzle and the hot fat to lay the dough in the fat, and means for rotating the nozzle to twist the lengths of dough being fed therefrom while their forward ends are engaged in the fat and inhibited from rotation with the nozzle by such engagement.

9. Apparatus of the character described comprising a reservoir for soft dough, a discharge nozzle having at least two discharge apertures, a reservoir for hot fat beneath and close to the nozzle, means for feeding dough from the reservoir to and through the nozzle to discharge predetermined lengths intermittently therefrom, means for moving the nozzle laterally above the fat while feeding dough therefrom and means including an arcuate rack and a pinion for rotating the discharge end portion of the nozzle to twist the dough discharged therefrom while the forward ends of the lengths of dough are engaged in the liquid fat in the tank.

10. An apparatus of the character described for making crullers of doughs of different kinds comprising two reservoirs for soft dough, a multi-aperture nozzle connected to the reservoirs, plunger means for feeding dough from each reservoir through the nozzle, means for twisting together the lengths of dough fed through the nozzle, and means for uniting the lengths of dough.

11. Apparatus of the character described comprising a reservoir for soft dough, a discharge nozzle connected to the reservoir having at least two discharge apertures, a tank adapted to hold hot fat beneath and close to the nozzle in position to receive dough discharged from the nozzle, means for feeding dough from the reservoir through the nozzle to discharge lengths of soft dough therefrom directly into the hot fat, means for causing relative lateral movement between the nozzle and the hot fat to lay the dough in the fat while the forward ends of the lengths of dough are engaged in the fat.

12. An apparatus for producing twisted cruller sticks of doughs of different kinds comprising two reservoirs for soft dough, plunger means for each reservoir, a two aperture nozzle through which dough may be fed from the reservoirs by said plunger means, a reservoir for hot fat beneath the nozzle and means for rotating the nozzle to twist the dough during discharge while the forward ends of the lengths of dough are engaged in the fat to inhibit rotation, whereby a crust forms on the dough to hold the shape and twist and to inhibit adhesion of the dough.

13. Apparatus as defined in claim 6 wherein the nozzle apertures are of generally triangular shape with points directed toward each other whereby the extruded lengths of dough are formed with narrow adjacent portions substantially as and for the purpose described.

14. The method of making a cruller from soft, fluent dough which comprises feeding a plurality of lengths of such dough vertically down into hot fat side by side, uniting the forward ends of the lengths before the same reach the hot fat, and uniting the rear ends of the lengths before they reach the hot fat.

15. The method of making a twisted cruller from soft, fluent dough which comprises feeding lengths of such dough vertically down into hot fat side by side, uniting the forward ends of the lengths before the same reach the hot fat, and twisting the lengths about each other from their upper ends while their forward ends are in the fat and inhibited from rotation thereby.

16. The method of making twisted cruller sticks which comprises feeding vertically downward into hot fat a plurality of lengths of soft, fluent dough, uniting the forward ends of said lengths of dough before they reach the fat, twisting said lengths during feeding while their forward ends are engaged in the fat and inhibited thereby from rotating with the twist, the dough being made of such fluent consistency that the resistance of the fat is sufficient to cause substantial twist of said lengths about each other to form a twisted cruller.

17. The method of making twisted cruller sticks which comprises feeding vertically downward into hot fat a plurality of lengths of soft, fluent dough, uniting the forward ends of such lengths of dough before they reach the fat, twisting said lengths of dough during feeding while the forward ends are in the fat, the dough being made of such fluent consistency that the resistance of the fat is sufficient to cause substantial twist of said lengths about each other to form a twisted cruller.

18. The method of making a twisted cruller from soft, fluent dough which comprises feeding lengths of such dough vertically down into hot fat to cause formation of a crust tending to prevent adherence of the lengths of dough and tending to give permanence to the shape of the lengths of dough, and twisting the lengths of dough about each other while they are being fed into the hot fat.

19. A device of the character described comprising a plurality of reservoirs for dough of different kinds, a nozzle having two apertures connected to said reservoirs and through which lengths of dough may be discharged into closely adjacent hot fat, means for uniting the dough so fed before it reaches the fat and means for twisting the lengths of dough during discharge.

ABRAHAM KIPNIS.

REFERENCES CITED

The following references are of record in the file of this patent:

UNITED STATES PATENTS

| Number | Name | Date |
|---|---|---|
| 573,432 | Megson | Dec. 15, 1896 |
| 917,581 | Gerdes | Apr. 6, 1909 |
| 1,392,034 | Westerman | Sept. 27, 1921 |
| 1,509,455 | Valenta | Sept. 23, 1924 |
| 1,709,280 | Ost | Apr. 16, 1929 |
| 1,821,689 | Broeg | Sept. 1, 1931 |
| 2,041,432 | Roth | May 19, 1936 |
| 2,199,825 | Kretchmer | May 7, 1940 |